(12) United States Patent
Morita et al.

(10) Patent No.: US 6,986,941 B2
(45) Date of Patent: Jan. 17, 2006

(54) MULTIPLE LAYERS LAMINATED POLYOLEFIN FOAM

(75) Inventors: Kazuhiko Morita, Kanuma (JP);
Takashi Muroi, Kanuma (JP);
Hirotoshi Kakuta, Kanuma (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 09/996,777

(22) Filed: Nov. 30, 2001

(65) Prior Publication Data

US 2003/0104197 A1 Jun. 5, 2003

(51) Int. Cl.
*B32B 3/26* (2006.01)

(52) U.S. Cl. .............................. 428/318.6; 428/319.3; 428/319.7; 428/314.4; 428/314.8; 428/212; 428/213

(58) Field of Classification Search ............. 428/318.6, 428/319.3, 319.7, 314.4, 314.8, 212, 213; 528/310
See application file for complete search history.

(56) References Cited

U.S. PATENT DOCUMENTS

| | | |
|---|---|---|
| 4,661,401 A | 4/1987 | Akao |
| 5,180,628 A | 1/1993 | Haardt et al. |
| 5,492,741 A | 2/1996 | Akao et al. |
| 5,693,414 A | 12/1997 | Peiffer et al. |
| 5,965,206 A | 10/1999 | Hilti |
| 6,316,587 B1 * | 11/2001 | Sheen et al. ................. 528/310 |
| 6,395,791 B1 * | 5/2002 | Chaudhary et al. ........... 521/60 |

FOREIGN PATENT DOCUMENTS

| | | |
|---|---|---|
| EP | 0371743 A2 | 6/1990 |
| EP | 0559189 A1 | 9/1993 |
| JP | 6313079 | 11/1994 |
| JP | 10000748 | 1/1998 |
| JP | 11105132 | 4/1999 |
| JP | 11277696 | 10/1999 |
| WO | WO 93/04860 | 3/1993 |

* cited by examiner

*Primary Examiner*—Hai Vo
(74) *Attorney, Agent, or Firm*—Sherman & Shalloway

(57) ABSTRACT

The present invention relates to a sheet or board like multiple layers laminated polyolefin foam having a plurality of polyolefin layers laminated on at least one side of a polyolefin foam by a coextrusion method. More specifically, the present invention relates to said multiple layers laminated polyolefin foam, wherein the thickness of the outermost layer constituting the plurality of polyolefin layers is 5 to 80 $\mu$m, and the density d (g/L) of the polyolefin foam, the melt flow rate X (g/10 min) of the polyolefin constituting the innermost layer among the plurality of polyolefin layers, and the thickness Y ($\mu$m) of the innermost layer of the multiple polyolefin layers satisfy the following relationships (1) to (4).

$Y \leq 0.29 dX$      (1)

$5 \leq X \leq 40$      (2)

$70 \leq Y \leq 300$      (3)

$100 \leq d \leq 300$      (4)

12 Claims, 3 Drawing Sheets

MULTIPLE LAYERS LAMINATED POLYOLEFIN FOAM

BACKGROUND OF THE INVENTION

1. Field of the Invention

Figure 1:
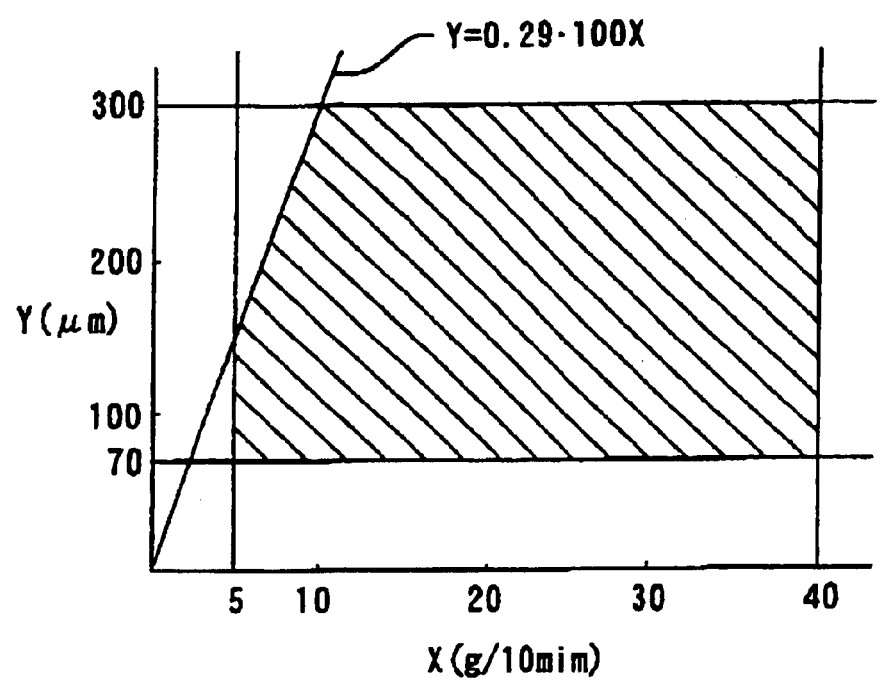
Figure 2:
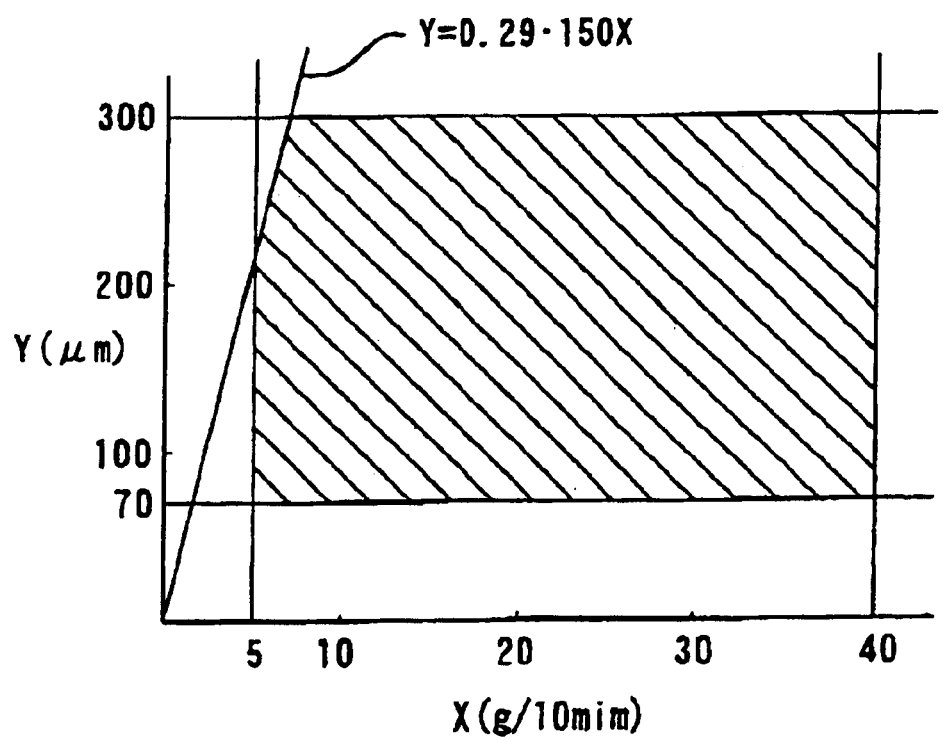
Figure 3:
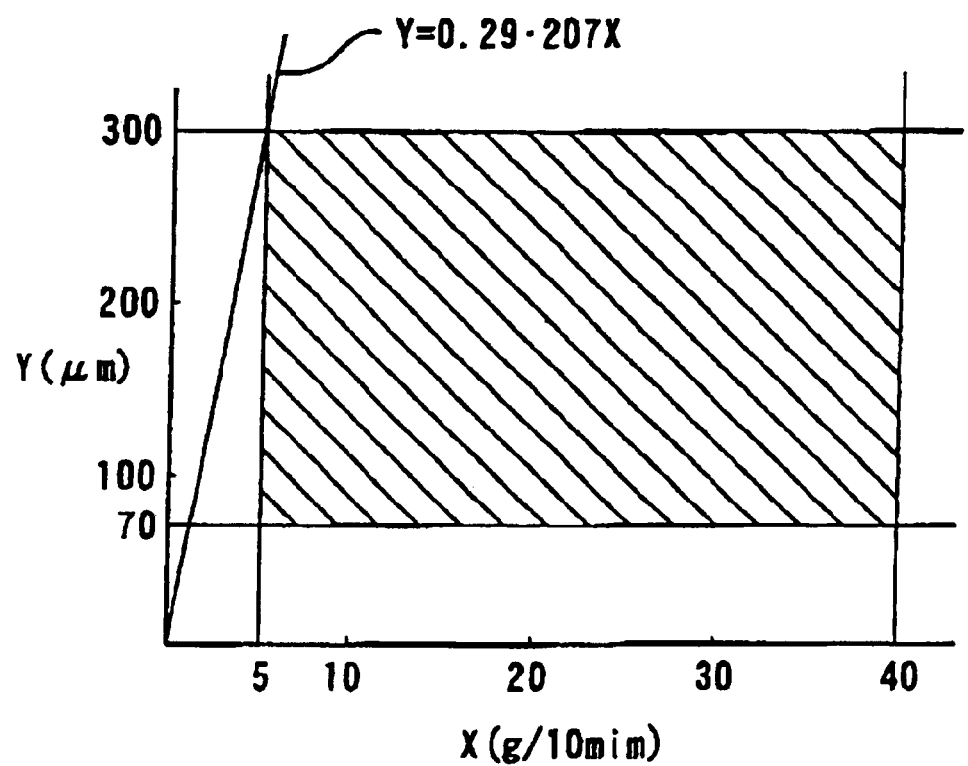

The present invention relates to a sheet or board like multiple layers laminated polyolefin foam suitable as partitions for containers, sheets or core materials for construction industry and civil engineering or for industrial goods, goods-delivery boxes in packaging applications, materials for harvest boxes and the like. More specifically, the present invention relates to a multiple layers laminated polyolefin foam in which multiple polyolefin layers are laminated on at least one side of a polyolefin foam sheet by a coextrusion method.

2. Description of the Related Art

Sheet or board like polyolefin foams have been widely used for various containers such as food trays, lunch boxes, bowls, cups, goods-delivery boxes, harvest boxes, and the like.

However, the polyolefin foams that have been used for the above-described applications had an expansion ratio of less than 3 times, were heavy, and had poor processability. Recently, the polyolefin foams have been suggested in which a polyolefin sheet was laminated on a polyolefin foam with an expansion ratio of 3 to 20 times. Such foams were disclosed, for example, in Japanese Patent Applications Laid-open Nos. H10-748, H11-105132, and H11-277696. Japanese Patent Application Laid-open No. H10-748 disclosed a board-like foam in which a synthetic resin film with a tensile strength of no less than 10 kg/mm$^2$ was laminated by a thermal lamination method on a board-like polyolefin foam with a density of 0.07 to 0.25 g/cm$^3$. Furthermore, Japanese Patent Application Laid-open No. H11-105132 disclosed a multiple layers synthetic resin foam in which a resin layer containing an inorganic filler in an amount of no less than 10 wt. % was laminated on a polyolefin foam sheet with a density of 0.5 to 0.1 g/cm$^3$ by a coextrusion method. Japanese Patent Application Laid-open No. H11-277696 disclosed a method for the manufacture of a foam in which a polyolefin is laminated on at least one side of a propylene foam by a coextrusion method, wherein a foam having a surface layer extruded to have a tubular shape is cut open to obtain a sheet-like foam and taken up under heating to a temperature no less than 20° C. below the thermal deformation temperature of the polyolefin constituting the surface layer; the application also disclosed a laminated foam sheet or board. However, those products did not always have satisfactory properties. Thus, bending strength was insufficient as compared with that of the foam with an expansion ratio of less than 3 times, sufficient rigidity could not be obtained, and adhesion between the foam and laminated resin was locally insufficient, causing local peeling.

Furthermore, in applications such various containers such as goods-delivery boxes or partitions for containers, and the like, it is required to provide a polyolefin foam with functional properties by laminating it with a resin layer having an antistatic agent, an electrically conductive additive, a fungicide or a colorant added thereto.

In order to provide a laminated foam with functional properties such as antistatic properties, an additive providing the functional properties such as antistatic properties is mixed with a polyolefin used for lamination. In such case, however, a laminated foam with sufficient rigidity often cannot be obtained. Accordingly, the present invention provides a multiple layers laminated polyolefin foam combining small weight with sufficient rigidity.

Furthermore, the present invention also provides a multiple layers laminated polyolefin foam in which multiple polyolefin layers are laminated on at least one side of a polyolefin foam by a coextrusion method, this multiple layers laminated polyolefin foam combining small weight with sufficient rigidity. Moreover, the present invention provides a multiple layers laminated polyolefin foam having excellent antistatic properties and combining small weight with sufficient rigidity.

The inventors have conducted an intensive study of the melt flow rate, etc. of polyolefins laminated on polyolefin foam by a coextrusion method and have discovered that the closed cell ratio of the foam is decreased and sufficient rigidity cannot be obtained when the melt flow rate of the polyolefin laminated by a coextrusion method is low, the thickness of the polyolefin is large, and the density of the laminated foam is small. However, this information led to a new problem. Thus, the melt flow rate of a polyolefin is unavoidably decreased by the addition of an additive providing the laminated polyolefin with functional properties with an object of providing the laminated foam with functional properties such as antistatic properties and the like, and even when a multiple layers laminated polyolefin foam combining small weight with high rigidity is attempted to be obtained by laminating a polyolefin with a large thickness by a coextrusion method, the closed cell ratio of the foam decreases and a sufficient rigidity cannot be obtained. To resolve this problem, the inventors have conducted additional intensive study which led to the conception of the present invention.

SUMMARY OF THE INVENTION (1) The present invention relates to a multiple layers laminated polyolefin foam in which multiple polyolefin layers are laminated on at least one side of a polyolefin foam by a coextrusion method, wherein the thickness of the outermost layer constituting the multiple polyolefin layers is 5~80 μm, and the density d (g/L) of the polyolefin foam, the melt flow rate X (g/10 min) of the polyolefin constituting the innermost layer among the multiple polyolefin layers, and the thickness Y (μm) of the innermost layer of the multiple polyolefin layers satisfy the following relationships (1) to (4):

$$Y \leq 0.29dX \tag{1}$$

$$5 \leq X \leq 40 \tag{2}$$

$$70 \leq Y \leq 300 \tag{3}$$

$$100 \leq d \leq 300 \tag{4}$$

(2) The base resin constituting the polyolefin foam and polyolefin layers in the multiple layers laminated polyolefin foam in accordance with present invention is of at least one type selected from polypropylenes and polyethylenes. (3) Further, the outermost layer among the polyolefin layers in the multiple layers laminated polyolefin foam in accordance with present invention contains a polymer-type antistatic agent so that the surface resistivity is no more than $1 \times 10^{13}$ Ω. (4) The polymer-type antistatic agent comprises at least one of polyetheresteramides and polyethers as the main component. (5) The outermost layer among the polyolefin layers in the multiple layers laminated polyolefin foam in accordance with present invention contains 2~30 wt. % polymer-type antistatic agent. (6) The thickness of the entire laminated foam in the multiple layers laminated polyolefin foam in accordance with present invention is 2~10 mm and the closed cell ratio of the laminated foam is no less than at least 60%.

DESCRIPTION OF THE PREFERRED EMBODIMENTS

In the multiple layers laminated polyolefin foam (simply referred to as "laminated foam" hereinbelow) in accordance with present invention polyolefin layers are laminated on one side or both sides of a polyolefin foam sheet or board (simply referred to as "foam" hereinbelow). The laminated foam has multiple polyolefin layers composed of at least two layers, that is, an innermost polyolefin layer (referred to as "innermost resin layer" hereinbelow) which is laminated on the foam surface and bonded thereto and an outermost polyolefin layer (referred to as "outermost resin layer" hereinbelow) located on the surface of the laminated foam and, if necessary, comprises resin layer(s) disposed between the innermost resin layer and outermost resin layer.

Furthermore, in the laminated foam in accordance with present invention, the thickness of the outermost layer is 5 to 80 $\mu$m, and the density, d (g/L), of the foam, the melt flow rate, X (g/10 min) of the polyolefin constituting the innermost resin layer, and the thickness, Y ($\mu$m), of the innermost resin layer satisfy the following relationships (1)~(4):

$$Y \leq 0.29 dX \quad (1)$$

$$5 \leq X \leq 40 \quad (2)$$

$$70 \leq Y \leq 300 \quad (3)$$

$$100 \leq d \leq 300 \quad (4)$$

When d, X, and Y do not satisfy the above relationships (1)~(4), a laminated foam with excellent physical properties such as rigidity and compressive strength cannot be obtained. Furthermore, when Y exceeds the value calculated as 0.29 ($\mu$m·L·10 min·g$^{-2}$)·d·X, under the conditions allowing the innermost resin layer with a thickness Y and a melt flow rate (abbreviated as MFR hereinbelow) X to be laminated on a foam with a density d and bonded thereto, the closed cell ratio of the surface portion of the foam onto which the innermost resin layer is laminated will decrease, degrading physical properties of the foam. As a result, physical properties of the obtained laminated foam will also be greatly degraded. Furthermore, the decrease in the closed cell ratio of the foam can also cause local peeling of the innermost resin layer. The above-mentioned decrease in the closed cell ratio of the foam is apparently caused by the collapse of the cell structure of the foam sheet under the effect of heat because the softened or melted synthetic resin layer (innermost resin layer) that can be laminated on the foam has a very high heat capacity. Further, Y is preferably no more than 0.26dX, even more preferably, no more than 0.23dX.

When X is less than 5 g/10 min, if the resin constituting the innermost resin layer is heated to a temperature at which the innermost resin layer demonstrates good lamination and bonding ability in lamination on the foam, then the heat capacity of the resin increases and this heat can decrease the closed cell ratio of the foam. On the other hand, when X exceeds 40 g/10 min, the appearance such as surface smoothness can be unsatisfactory. The MFR:X, of the resin constituting the innermost resin layer is preferably 8 to 40 (g/10 min), even more preferably, 10 to 40 (g/10 min).

When Y is less than 70 $\mu$m, physical properties such as rigidity become insufficient, and when it exceeds 300 $\mu$m, the laminated foam can loose its lightness and the closed cell ratio of the foam can decrease. The Y is preferably 100~250 $\mu$m, even more preferably, 130~250 $\mu$m.

Furthermore, when the density, d, of the foam is less than 100 g/L, it is too low and physical strength such as rigidity and compressive strength of the laminated foam can be lost. On the other hand, when it is above 300 g/L, the lightness of the laminated foam can be lost. The density, d, of the foam sheet is preferably 120 to 300 g/L.

The outermost resin layer in the laminated foam in accordance with present invention has a thickness of 5~80 $\mu$m. Even when expensive functional additives such as polymer-type antistatic agents or fungicides are contained in the laminated foam having such structure, if they are incorporated in a minimum quantity only in the outermost layer, the concentration required for the additives to produce their effect can be obtained and the anticipated function can be demonstrated even with a small amount of additives. As a result, a sufficient effect can be obtained even when the functional additives are used in small amounts.

When a single resin layer is laminated on the foam, the addition of functional additives often decreases the MFR of the resin constituting the resin layer, or it is often necessary to decrease the MFR of the resin constituting the resin layer to which the functional additives are added, for example, because the functional additives cannot be effective due to kneadability of the resin with the additives. In such a case, the closed cell ratio of the foam is decreased. However, since the laminated foam in accordance with present invention has multiple resin layers, the above-mentioned situations can be avoided by adding the additives only to the outermost resin layer.

Measurement of MFR, as referred to in the present specification, is conducted at a test temperature of 230° C. under a load of 21.18N according to method A of JIS-K7210 (1999), regardless of the type of the base resin.

The thickness of resin layers and the thickness of the laminated foam, as referred to in the present specification, can be determined by taking pictures in ten equidistant points under a microscope of a section across the width of the laminated foam perpendicular to the extrusion direction of the foam, measuring the thickness based on the photographs, and averaging the results. However, when the interfaces between the resin layers are not clearly defined, the thickness can be determined based on the ratio of discharge rates of the layers in coextrusion process.

The density of foam sheet, as referred to in the present specification, is determined by cutting the foam sheet from the laminated foam and dividing the weight (g) of the cut sample by the volume (L) determined from the outer dimensions of the sample.

Because the laminated foam in accordance with the present invention has the above-described structure, it is possible to obtain laminated foams with physical properties within a wide range by appropriately selecting the combination of the type of the base resin, thickness, and density in the foam, outermost resin layer, innermost resin layer, and other resin layers.

The laminated foam in accordance with the present invention preferably has a thickness of 2 to 10 mm, even more preferably, 3 to 8 mm. If the thickness of the entire laminated foam is less than 2 mm, the wall thickness of boxes, containers, and the like obtained by processing the laminated foam is insufficient, and their strength, heat resistance, and impact resistance are decreased. On the other hand, if the thickness of the entire laminated foam is more than 10 mm, then its bendability, e.g., in hinging, and processability in molding of containers, and the like can be decreased.

The foam constituting the laminated foam in accordance with the present invention can be manufactured by an extrusion foaming method. Multiple polyolefin layers are laminated on and bonded to the foam sheet or board by a coextrusion method when the foam sheet or board is manufactured by the extrusion foaming method. The utilization of the coextrusion method is also preferred from the standpoint of forming the outermost resin layer with a thickness of 5~80 μm.

Manufacture of the foam in accordance with the present invention by the extrusion foaming method will be described below in greater detail. The foam can be obtained by melting a base resin in an extruder, while kneading it with a foaming agent, and then extruding and foaming the molten blend into a low-pressure region through a die installed at the front end of the extruder. A sheet-like foam is preferably obtained by a method comprising the steps of using a circular die having a ring-like lip, extruding and foaming through the lip of the die to obtain a tubular foam, and then cut opening the tube to obtain a sheet. The cut-opened sheet-like foam is preferably subjected to hot stretching to obtain excellent smoothness, as described in Japanese Patent Application Laid-open No. H11-277696 and by this method, the sheet-like foam becomes the board-like foam. The sheet or board like foam can be also manufactured by extrusion through a flat die such as T-die, instead of the circular die.

The base resin constituting the foam in accordance with the present invention is a polyolefin. Examples of polyolefins include polypropylenes and polyethylenes. Polyolefins have extreme flexibility, have excellent physical strength, such as tensile strength, and good chemical resistance, and are suitable for extrusion foaming. For this reason they are excellent materials as the base resin constituting the foam in accordance with the present invention. Polypropylenes having especially high rigidity and heat resistance among the polyolefins are preferably used in accordance with the present invention.

Examples of the polypropylenes include propylene homopolymers or copolymers of propylene with other copolymerizable olefins. Examples of other copolymer components which are copolymerizable with propylene include ethylene or $C_{4-10}$ α-olefins such as ethylene, 1-butene, isobutylene, 1-pentene, 3-methyl-1-butene, 1-hexene, 3,4-dimethyl-1-butene, 1-heptene, and 3-methyl-1-hexene. The copolymer may be a random copolymer or a block copolymer. Further, the copolymer may consist not only of two, but also of three monomers. Moreover, the polypropylenes can be used individually or in a mixture of two or more thereof.

Even among the above-mentioned polypropylenes, a polypropylene with a melt tension higher than that of the ordinary polypropylenes is preferred as the resin suitable for extrusion foaming. Specific examples of preferred polypropylenes include (1) a polypropylene having a branching index of less than 1 and a significant strain hardening elongation viscosity, or (2) a polypropylene with (a) a z-average molecular weight (Mz) of no less than $1.0 \times 10^6$ or a ratio (Mz/Mw) of the z-average molecular weight (Mz) to weight-average molecular weight (Mw) of no less than 3.0 and (b) either an equilibrium compliance $J_o$ of no less than $1.2 \times 10^{-3}$ m$^2$/N or a shear strain recovery Sr/S per unit stress of no less than $5 \times 10^{-4}$ m$^2$ per second, as described in Japanese Patent Application Laid-open No. H7-53797.

Other examples of polypropylenes that may be used in accordance with the present invention include: (3) polypropylenes modified by melt kneading a blend containing a radical polymerization monomer such as styrene and a radical polymerization initiator or additives at a temperature at which the polypropylene is melted and which is no less than the reaction temperature of the radical polymerization initiator, and (4) modified polypropylenes obtained by melt kneading a polypropylene with an isoprene monomer and a radical polymerization initiator.

Preferred among the above-described base resins are those which have a low ratio of insoluble components into xylene.

The ratio of insoluble components is determined by the formula presented below by using a polypropylene or a foam thereof that has been accurately weighed as a sample, placing the sample into boiling xylene at a temperature of around 140° C., heating and refluxing for 8 hours, then rapidly filtering through a 100-mesh metal net, drying the components insoluble in boiling xylene that remained on the metal net for 24 hours in an oven at a temperature of 20° C., and then measuring the weight G (g) of insoluble components. The ratio of insoluble components is preferably 0 to 10 wt. %, more preferably, 0 to 5 wt. %, even more preferably, 0 to 2 wt. %. Resins with a low ratio of insoluble components can be easily recycled and are preferred from the standpoint of cost reduction.

Ratio of insoluble components (wt. %)=[$G(g)$/sample weight $(g)$]×100.

In accordance with the present invention, a blend prepared by mixing, if necessary, of a polypropylene with other resins can be used as the base resin constituting the above-mentioned foam sheet. Examples of such other resins include elastomers such as ethylene-propylene rubbers or ionomers, polyethylenes, polybutenes, vinyl chloride resins such as poly(vinyl chloride), vinyl chloride-vinyl acetate copolymer, and the like, polystyrenes, and the like. When such other resins are admixed, the mixing ratio thereof is preferably no more than 40 wt. % based on the total weight of the base resin.

When the base resin of the foam in accordance with the present invention is composed of polyethylenes, examples of such polyethylenes include compositions containing no less than 60 wt. % ethylene homopolymer and copolymers of ethylene and α-olefins containing 3 to 12 carbon atoms. Specific examples include high-density polyethylene, medium-density polyethylene, low-density polyethylene, straight-chain low-density polyethylene, straight-chain ultralow-density polyethylene, ethylene-vinyl acetate copolymer, ethylene-butene copolymer, ethylene-maleic anhydride copolymer, and the like. Therefore, the base resin of the foam can be composed of a blend of a polyethylene with other resins.

Furthermore, the base resin of the foam in accordance with the present invention can be composed of a mixed resin of a polypropylene and a polyethylene.

Inorganic foaming agents and volatile foaming agents can be used for the manufacture of the foam in accordance with the present invention. Examples of inorganic foaming agents include carbon dioxide, air, and nitrogen. Examples of volatile foaming agents include aliphatic hydrocarbons such as propane, n-butane, i-butane, pentane, hexane, and the like, ethers such as dimethylether, methylethylether, diethylether, and the like. Those foaming agents can be also used in appropriate mixtures thereof.

Furthermore, if necessary, various additives can be added to the base resin so that the foam in accordance with the present invention may manufacture it. Examples of additives include nucleating agents, e.g., inorganic powders such as talc, silica, and the like, or acidic salts of polycarboxylic acids, reaction products of polycarboxylic acids with sodium carbonate or sodium bicarbonate, and the like, inorganic fillers such as talc, silica, calcium carbonate, clay, zeolites, alumina, barium sulfate, and the like (talc and silica also serve as nucleating agents), thermal stabilizers, UV absorbers, antioxidants, colorants, and the like. Antistatic agents and fungicides may be also blended.

The closed cell ratio of the laminated foam in accordance with the present invention is preferably no less than at least 60%, even more preferably, no less than 70%, and still more preferably, no less than 80%. If the closed cell ratio is less than 60%, then bending strength or compressive strength of the laminated foam decreases and, for example, physical strength containers, and the like obtained by processing the laminated foam decreases, and they have the possibility that they cannot be used as goods-delivery boxes or harvest containers.

The closed cell ratio S (%) of the laminated foam, as referred to in the present specification, is calculated by the following formula (6) from the true volume Vx of laminated foam measured according to procedure C described in ASTM D2856-70 by using Air Comparison Pycnometer 930 manufactured by Toshiba Beckman Co., Ltd.

$$S(\%)=(Vx-W/\rho)\times 100/(Va-W/\rho) \qquad (6)$$

In formula (6), Vx stands for a true volume (cm$^3$) measured by the above-mentioned method, which is equivalent to a sum of the volume of the resin constituting the laminated foam and the total volume of cells in the closed cell portion inside the laminated foam. Further, Va, W, and ρ in formula (6) are described below.

Va: apparent volume of the laminated foam calculated from the external dimensions of the laminated foam used for the measurements (cm$^3$).

W: total weight of the laminated foam used for the measurements (g).

ρ: density of the resin constituting the laminated foam used for the measurements (g/cm$^3$).

The density ρ of the resin constituting the laminated foam used for the measurements can be determined from the sample prepared by collapsing the cells in the laminated foam with a heat press.

Since the sample has to be contained in a non-compressed state in the sample cup provided in the air comparison pycnometer, the sample is cut to a length and a width of 2.5 cm each and a height of 4 cm so as to have an apparent volume of 25 cm$^3$. When the thickness of the laminated foam is less than 4 cm, several samples for measurements that have been cut from the laminated foam are combined so as to obtain a volume most close to 25 cm$^3$, and this combination is used as a sample.

Polyolefins such as polypropylenes or polyethylenes of the same type which demonstrate sufficient ability of thermal bonding to the foam are used as the base resins constituting the innermost resin layer of the polyolefin layers in the laminated foam in accordance with the present invention. Further, the outermost resin layer prefers to show sufficient ability of thermal bonding to the inner resin layer. In addition, other resin layers such as layers of polyamide resins, vinylidene chloride resin, and saponified ethylene-vinyl acetate copolymer having a gas barrier function can be provided, if necessary, between the outermost resin layer and innermost resin layer via an adhesive. Moreover, a layer comprising recycled starting materials can be used as the innermost resin layer in order to obtain an inexpensive laminated foam.

One or more types of additives such as polymer-type antistatic agents, fungicides, elastomers, and the like can be added to the base resin constituting the outermost rein layer of the laminated foam in accordance with the present invention in order to obtain a more functional laminated foam in accordance with the present invention.

Polyolefins typically have a surface resistivity of $1\times10^{16}$ to $1\times10^{20}$ Ω. When the surface resistivity exceeds $1\times10^{13}$ Ω, static charges are accumulated on the surface of the laminated foam and dust easily adheres thereto. Accordingly, in order to provide the surface with antistatic properties, a surfactant with a low molecular weight, such as a partial ester of glycerin (for example, glycerin monostearate) is kneaded into the polyolefin. In this case, however, the antistatic effect is not demonstrated unless the surfactant is present on the surface. Therefore, when a surfactant with a low molecular weight was used in the manufacture of polyolefin foams, a respective time was required before the antistatic effect was demonstrated, and no antistatic effect was demonstrated unless the above-described surfactant incorporated moisture present in the air. Therefore, a problem associated with such manufacturing process was that the antistatic effect was greatly affected by the season or the environment in which the foam was used, and the desired antistatic effect was sometimes not produced.

Furthermore, if the foam having the above-mentioned surfactant added thereto if washed with water and a detergent, the surfactant is washed out and the antistatic effect is lost. For this reason, goods-delivery boxes using the foam having such surfactant added thereto are difficult to wash and reuse and they are hardly suitable for returnable usage in applications adversely affected by static charges or dust.

A polymer-type antistatic agent is preferably used in the laminated foam in accordance with the present invention in order to provide the laminated foam with antistatic properties. The laminated foam obtained by incorporating such antistatic agent in the polyolefin constituting the outermost resin layer of the laminated foam in accordance with the present invention demonstrates a sufficient antistatic effect immediately after molding and the antistatic effect is not lost in washing. On the other hand, polymer-type antistatic agents are very expensive and in order to manufacture an inexpensive product, it is desired that a sufficient effect be demonstrated at a small amount of the antistatic agent. In the laminated foam in accordance with the present invention, the outermost resin layer is formed so as to have a small thickness. Therefore, blending the polymer type antistatic agent only into the outermost resin layer of the laminated foam in accordance with the present invention makes it possible to demonstrate a sufficient antistatic effect with a small absolute amount of the antistatic agent. It is desired that the outermost resin layer in the laminated foam in accordance with the present invention be formed as thin as possible within a range in which the anticipated characteristic properties provided for by the addition of functional additives are not lost. Typically, the outermost resin layer is formed to have a thickness of 5~80 μm, preferably, 10~50 μm.

If the polymer-type antistatic agent is simply blended with the polyolefin, the antistatic effect is not fully demonstrated. Apparently, the antistatic effect cannot be demonstrated unless the antistatic agent is arranged on the resin layer surface in a state in which it is dispersed in a vein-like manner and forms a continuous layer on the surface of the polyolefin layer forming the outermost resin layer (such state is referred to as a network structure hereinbelow). Such a network structure is easily formed by providing an appropriate orientation when the outermost surface layer is formed.

In accordance with the present invention, the above-described polymer-type antistatic agent is incorporated into the polyolefin constituting the outermost resin layer so that the surface resistivity of the outermost surface layer is no more than $1 \times 10^{13}$ Ω, preferably, no more than $1 \times 10^{12}$ Ω, even more preferably, no more than $1 \times 10^{11}$ Ω. No limitation is placed on the lower limit of the surface resistivity of the outermost surface layer controlled by the addition of the polymer-type antistatic agent; usually it is $1 \times 10^{8}$ Ω.

The surface resistivity as referred to in the present specification is measured according to JIS-K6911.

More specifically, three samples (length: 100 mm, width: 100 mm, thickness: sample thickness) are cut equidistantly from the obtained laminated foam in the lateral direction thereof perpendicular to the extrusion direction of the foam. The samples are allowed to stay for 24 hours in an atmosphere with a temperature of 23° C. and a humidity of 50%. Then, the surface resistance of the samples is measured. The average value of the measurement results is considered as a surface resistivity.

In the present specification, the term polymer-type antistatic agent means a resin with a number-average molecular weight of at least no less than 300, preferably, 300 to 300,000, even more preferably, 600 to 15,000, and with a surface resistivity of less than $1 \times 10^{12}$ Ω, preferably less than $1 \times 10^{9}$ Ω. Furthermore, the polymer-type antistatic agent as referred to in the present specification may contain inorganic salts or organic protonic acid salts with a low molecular weight, for example, $LiClO_4$, $LiCF_3SO_3$, $NaClO_4$, $LiBF_4$, $NaBF_4$, $KBF_4$, $KClO_4$, $KPF_3SO_3$, $Ca(ClO_4)_2$, $Mg(ClO_4)_2$, $Zn(ClO_4)_2$, and the like. The upper limit for the molecular weight of the polymer-type antistatic agent is about 500,000.

The above-mentioned molecular weight is a number-average molecular weight obtained by employing gel permeation chromatography and using a calibration curve plotted for polystyrene with a known molecular weight.

The upper limit for the melting point of the polymer-type antistatic agent is about 270° C. and the lower limit is about 70° C.

Specific examples of the polymer-type antistatic agent, as referred to in the present specification, include resins, such as polyethylene oxide, polypropylene oxide, polyethylene glycol, polyethers, polyesteramides, polyetheresteramides, ionomer such as ethylene-methacrylic acid copolymer, and the like, polyethylene glycol methacrylate polymers, and the like, that have a polar group in a molecular chain in a quaternary ammonium salt and can form complexes or solvate with inorganic salts or organic protonic acid salts with a low molecular weight. Above-described resins that have formed complexes or solvated with the inorganic salts or organic protonic acid salts may also be used.

Agents containing polyetheresteramides or polyethers as the main components are especially preferred among the above-described polymer-type antistatic agents used in accordance with the present invention. Such antistatic agents can demonstrate an excellent antistatic performance, regardless of the value of the ratio of the melt flow rate of the base resin of the outermost resin layer and the melt flow rate of the antistatic agent. Furthermore, in order to improve compatibility of such antistatic agents with the polyolefin constituting the outermost resin layer, obtain an excellent antistatic effect, and suppress the degradation of physical properties, it is preferred that the polyolefin of the same type be copolymerized or mixed with the polymer-type antistatic agents. In the present specification, the term "as the main component" used hereinabove means that the polyetheresteramide component or polyether component is contained at a ratio of no less than 50 wt. %, preferably, no less than 75 wt. %, even more preferably, no less than 85 wt. %. Using such antistatic agents and forming a network structure of the polymer-type antistatic agent in the outermost resin layer by the extrusion method makes it possible to form easily the outermost resin layer with a surface resistivity of no more than $1 \times 10^{13}$ Ω.

The aforesaid polyetheresteramides of the antistatic agent, as referred to in the present specification, are obtained by polymerization of polyamides (1) listed hereinbelow and alkylene oxide adducts of bisphenols (2).

Examples of polyamides (1) include: (a) polymers obtained by lactam ring-opening polymerization, (b) polycondensates of aminocarboxylic acids, or (c) polycondensates of dicarboxylic acids and diamines. Examples of lactams mentioned in (a) include caprolactam, enantholactam, laurolactam, undecalactam, and the like.

Examples of aminocarboxylic acids mentioned in (b) include ω-aminocaproic acid, ω-aminoenanthic acid, ω-aminocaprylic acid, ω-aminopelargonic acid, ω-aminocapric acid, 11-aminoundecanoic acid, 12-aminododecanoic acid, and the like.

Examples of dicarboxylic acids mentioned in (c) include adipic acid, azelaic acid, sebacic acid, undecanedioic acid, dodecanedioic acid, isophthalic acid, and the like. Examples of diamines include hexamethylenediamine, heptamethylenediamine, octamethylenediamine, decamethylenediamine, and the like.

Among the amido-forming monomers listed above, monomers of two or more types may be used. The preferred among them are caprolactam, 12-aminododecanoic acid, and adipic acid—hexamethylenediamine, and the especially preferred is caprolactam.

Examples of bisphenols in the aforesaid alkylene oxide adducts of bisphenols (2) include bisphenol A (4,4'-dihydroxydiphenyl-2,2-propane), bisphenol F (4,4'-dihydroxydiphenylmethane), bisphenol S (4,4'-dihydroxydiphenylsulfone), 4,4'-dihydroxydiphenyl-2,2-butane, and the like. Among them, bisphenol A is especially preferred.

Examples of alkylene oxides in the aforesaid alkylene oxide adducts of bisphenols (2) include ethylene oxide, propylene oxide, 1,2- or 1,4-butylene oxide, and mixtures of two or more thereof. Among them, ethylene oxide is preferred.

In accordance with the present invention, the melting point of the polyetheresteramide contained in the outermost resin layer is preferably no higher than 230° C., more preferably, no higher than 200° C. If the melting point is above 230° C., when the polyolefin is melted and mixed together with the polyetheresteramide, the temperature of the two resins has to be increased above the necessary level, which can cause degradation of the polyolefin.

Examples of polyethers as the aforesaid antistatic agents, as referred to in the present specification, include cationic antistatic agents consisting of compounds having no less than 2 quaternary ammonium bases in a molecule, those compounds being the reaction products of (a) oxyalkylene ethers obtained by addition reaction of alkylene oxides with phenols-divinyl benzene addition polymers, (b) glycidyl ethers of polyoxyalkylene glycols such as polyoxyethylene glycol, polyoxypropylene glycol, polyoxybutylene glycol, and the like or diglycidyl ethers of alkylene oxide adducts of bisphenols, amine compounds having aliphatic hydrocarbon groups containing 1 to 22 carbon atoms, preferably, amine compounds having aliphatic hydrocarbon groups containing 6 to 22 carbon atoms, such as hexyl, n-octyl, 2-ethylhexyl, nonyl, decyl, dodecyl, tetradecyl, octadecyl, oleyl, and the like, and quaternizing agents such as alkyl esters of sulfuric acid, such as dimethyl sulfate, diethyl sulfate, and the like, alkyl esters of carbonic acid, such as dimethyl carbonate, diethyl carbonate, and the like, and various phosphates or halides such as trimethyl phosphate, alkylbenzyl chlorides, benzyl chloride, alkyl chlorides, alkyl bromide, and the like.

Examples of the aforesaid alkylene oxides include ethylene oxide, propylene oxide, and butylene oxide; among them, ethylene oxide and a copolymer of ethylene oxide and propylene oxide are preferred. The number of added moles of alkylene oxide is usually 1 to 500, preferably, 20 to 300. The content ratio of oxyalkylene in the oxyalkylene ether is 10 to 95 wt. %, preferably, 20 to 90 wt. %, still more preferably, 30 to 80 wt. %.

Examples of bisphenols in the aforesaid alkylene oxide adducts of bisphenols include bisphenol A (4,4'-dihydroxydiphenyl-2,2-propane), bisphenol F (4,4'-dihydroxydiphenylmethane), bisphenol S (4,4'-dihydroxydiphenylsulfone), 4,4'-dihydroxydiphenyl-2,2-butane, and the like.

Among the above-mentioned diglycidyl ethers, examples of the especially preferred ones include glycidyl ether of polyoxyethylene glycol, diglycidyl ether of ethylene oxide adduct of bisphenol, and mixtures thereof.

Among the above-mentioned amine compounds, the especially preferred one is N-alkyl ($C_{1-18}$) diethanolamine.

Among the above-mentioned quaternizing compounds, the especially preferred ones are dimethyl sulfate and diethyl sulfate.

The MFR, α (g/10 min), of the polymer-type antistatic agent in the laminated foam in accordance with the present invention is no less than 10 (g/10 min), preferably 10~150 (g/10 min), with the upper limit being about 500 (g/10 min). Furthermore, the MFR, β (g/10 min), of the base resin constituting the outermost layer is no less than 2 (g/10 min), preferably 3 to 35 (g/10 min), even more preferably, 8~35 (g/10 min), the upper limit preferably being no more than 40 (g/10 min). The ratio (α/β) of the MFR, α, of the polymer-type antistatic agent and MFR, β, of the base resin constituting the outermost layer is preferably no less than at least 0.5, more preferably 1~250, and still more preferably 1~150. When the polymer-type antistatic agent is an ionomer-type antistatic agent, the ratio (α/β) of the MFR, α (g/10 min), of the polymer-type antistatic agent and MFR, β (g/10 min), of the base resin constituting the outermost layer should be no less than at least 2.5 for the antistatic agent to form a network structure in the outermost resin layer and to demonstrate sufficient antistatic properties.

In order to increase compatibility with the polyolefin constituting the outermost resin layer and to obtain excellent antistatic effect and excellent effect suppressing the degradation of physical properties, a compound prepared by copolymerizing the polyolefins of the same type, preferably, a modified polyolefin with a number-average molecular weight of 800 to 25,000 or a polyamide with a polymer-type antistatic agent, or a mixture thereof is used as the polyetheresteramide or polyether preferably employed in accordance with the present invention. Examples of polyamides suitable for this purpose include polyamide 4, polyamide 6, polyamide 11, polyamide 12, polyamides 6/6, 6/10, 6/9, 6/12, 4/6, 12/12, aromatic polyamide of m-xylenediamine and adipic acid, polyamides obtained from hexamethylenediamine and isophthalic acid and/or terephthalic acid with the addition, if necessary, of an elastomer, or copolymers of those polyamides with polyolefins, olefin copolymers, ionomers, elastomers, polyethylene glycol, polypropylene glycol, or polytetramethylene glycol, EPDM or ABS-modified polyamides or copolyamides, and the like.

Those polyolefins or polyamides are compounded so that the content ratio of the polyetheresteramide or polyether of the polymer-type antistatic agent, as described above, is at least 50 wt. %, preferably, 75 wt. %, still more preferably, 85 wt. %.

The amount of the polymer-type antistatic agent added to the outermost resin layer in the laminated foam in accordance with the present invention is preferably 2 to 30 wt. %, still more preferably, 5 to 25 wt. %, and even more preferably, 10 to 20 wt. %. When the amount added is less than 2 wt. %, the antistatic effect can be insufficient. If it is above 30 wt. %, physical properties of the outermost resin layer can be degraded or the outermost resin layer itself can be difficult to make and the inexpensive laminated foam is difficult to manufacture.

The laminated foam (especially, in the outermost resin layer) in accordance with the present invention, if desired, can be provided with bactericidal properties. Examples of fungicides that can be used in accordance with the present invention include inorganic fungicides such as metals (ions) having bactericidal activity, such as silver, copper, zinc, and the like, which are supported on a support, for example, silver zeolite, copper zeolite, silver-supporting zirconium phosphate, silver-supporting silica gel, and the like, fungicides using oxide-based photocatalysts such as anatase-type titanium oxide, and organic fungicides such as benzalkonium chlorides, polyoxyethylene trialkyl ammonium chlorides, polyhexamethylene biguanido hydrochloride, 3-(trimethoxysilyl) propyldimethyloctadecyl ammonium chloride, and the like.

In the laminated polyolefin foam in accordance with the present invention, in which multiple layers of polyolefin are laminated on at least one side of a polyolefin foam, among the polyolefin layers laminated on and bonded to the foam, the thickness of the innermost resin layer is 70~300 μm, the MFR of the base resin constituting the innermost resin layer is 5~40 g/10 min, and the density of the foam is 100~300 g/L. When those layers satisfy the above-described specific conditions, resin layers of sufficient thickness can be formed on the foam, without decreasing the closed cell ratio of the foam, and a laminated foam is obtained which has an especially good physical strength such as bending strength. Furthermore, because mixing of additives, which make fluidity decline, decreases MFR and causes the decrease in the closed cell ratio of the foam, forming a polyolefin layer with a thickness of 5~80 μm as the outermost resin layer makes it possible to provide a resin layer which is difficult to laminate and bond directly to the foam. Moreover, sufficient results are obtained by the addition of the expensive additives only to a thin outermost resin layer, the target effect can be fully demonstrated without the addition of large quantities of additives, and a laminated foam is provided with functional properties at a low cost. It is preferred that the thickness of the outermost resin layer be less than that of the innermost resin layer.

EXAMPLE

The present invention will be described below in greater details based on examples thereof which, however, place no limitation on the present invention.

Polyolefins and polymer-type antistatic agents that were used in examples and comparative examples are presented below. In the examples and comparative examples, the melt flow rate is represented by MFR.

(I) Polyolefins

Resin I: GRAND POLYMER CO., LTD. Trade name J704U (propylene-ethylene block copolymer) (MFR: 5 g/10 min)

Resin II: SunAllomer Ltd., recovered starting materials of trade name SD632 (polypropylene) (MFR: 10 g/10 min).

Resin III: SunAllomer Ltd., trade name PM870A (propylene-ethylene block copolymer) (MFR: 17 g/10 min).

Resin IV: Idemitsu Petrochemical Co., Ltd., trade name J950HP (propylene-ethylene block copolymer) (MFR: 32 g/10 min).

Resin V: Idemitsu Petrochemical Co., Ltd., trade name E200 GP (propylene homopolymer) (MFR: 2 g/10 min).

Resin VI: SunAllomer Ltd., trade name SD632 (polypropylene) (MFR: 3.2 g/10 min).

Resin VII: NIPPON UNICAR CO., LTD., trade name NUC8008 (low-density polyethylene) (MFR: 9.6 g/10 min).

Resin VIII: Idemitsu Petrochemical Co., Ltd., trade name 130J (high-density polyethylene) (MFR: 20 g/10 min).

(II) Polymer-type Antistatic Agents

Polymer A: Ciba Specialty Chemicals K. K., trade name IRGASTAT P 18 (a polymer-type antistatic agent containing polyetheresteramide as the main component) (MFR: 17 g/10 min, melting point: 180° C.).

Polymer B : Ciba Specialty Chemicals K. K., trade name IRGASTAT P 22 (polymer-type antistatic agent containing polyetheresteramide as the main component) (MFR: 21 g/10 min, melting point: 220° C.).

Polymer C: Sanyo Chemical Industries, Ltd., trade name J-STAT 3180 (polymer-type antistatic agent containing polyetheresteramide as the main component) (MFR : 70 g/10 min, melting point 160° C.).

Polymer D: DU PONT—MITSUI POLYCHEMICALS CO., LTD., trade name SD100 (polymer-type antistatic agent containing ethylene-based ionomer as the main component) (MFR: 20 g/10 min, melting point 92° C.).

Polymer E: Sanyo Chemical Industries, Ltd., trade name PELESTAT 300 (polymer-type antistatic agent containing polyether as the main component), (MFR: no less than 100 g/10 min, melting point 136° C.).

The melting point of resins, as referred to in the present specification, is a melting point measured according to JIS K7121-1987. When no less than two peaks are observed in the DSC curve, the apex temperature of the peak with the largest surface area is considered as the melting point.

Example 1

A tandem extruder consisting of two extruders with diameters of 90 mm and 120 mm was used as the apparatus for the manufacture of the foam of the laminated foam. An extruder with a diameter of 50 mm was used for molding the innermost resin layer, and an extruder with a diameter of 40 mm was used for molding the outermost resin layer. A ring-like die with a diameter of 140 mm and a spacing of 1.0 mm was used as a coextrusion die for obtaining a laminated foam in which the innermost resin layer and the outermost resin layer were laminated on and bonded to the foam.

First, in order to obtain the foam, 100 wt. parts of polypropylene resin (resin VI) and 0.5 wt. part of nucleating agent (prepared by blending 6 wt. parts of sodium citrate with 100 wt. parts of low-density polyethylene with a melting point of 109° C. and a MFR of 5.4 g/10 min) were fed from a starting material charging hopper of the extruder with a diameter of 90 mm, and the components were heated and kneaded to obtain a melted resin mixture with a temperature of about 200° C. A mixed foaming agent consisting of n-butane 70 wt. % and i-butane 30 wt. % was injected into the melted resin mixture so as to obtain 1.2 wt. part of the foaming agent per 100 wt. parts of resin VI. Then, the melted resin mixture containing the foaming agent was fed into the extruder with a diameter of 120 mm that was connected downstream of the extruder with a diameter of 90 mm, the viscosity of the melted resin was adjusted, and a foamable melted resin mixture was obtained.

On the other hand, resins shown in Table 2 which constitute the innermost resin layer were fed into an extruder with a diameter of 50 mm where they were melt kneaded to obtain a melted resin. A resin mixture of an antistatic agent and resins shown in Table 2 which constitute the outermost resin layer was melt kneaded with an extruder with a diameter of 40 mm to obtain a melted resin containing an antistatic agent. The obtained foamable melted resin mixture, melted resin, and melted resin containing an antistatic agent were fed in a convergent die. The antistatic agent-containing melted resin forming the outermost resin layer, the melted resin forming the innermost resin layer, and the foamable melted resin mixture were laminated, converged, and coextruded from a ring-like die to form a tubular laminated foam in which layers were laminated in the following order from the outer side: outermost resin layer/innermost resin layer/foam/innermost resin layer/outermost resin layer. The extruded tubular laminated foam was cut and opened, while being drawn along a cooled cylinder, and then both surfaces of the laminated foam were heated in a heating furnace while being pulled to flatten it and obtain the target laminated foam board.

Table 2 shows the types, melt flow rate (MFR), and layer thickness of resins constituting the innermost and outermost resin layers of the laminated foam. The MFR: X and thickness: Y of the polyolefin composition constituting the innermost resin layer, the thickness (mm), closed cell ratio (%), and surface resistivity($\Omega$) of the lamented foam, and the density: d (g/L) of the foam are presented in Table 1.

Examples 2 to 10, Comparative Examples 1, 2

The laminated foams were obtained in the same manner as in Example 1, except that the amount of the foaming agent added was 2.8 wt. parts per 100 wt. parts of resin VI; all other conditions are presented in Table 2. Physical properties of the laminated foams obtained in the same manner as in Example 1 are presented in Table 1 and Table 2.

Examples 11, 12

The laminated foams were obtained in the same manner as in Example 1, except those parameters shown in Table 2 and that resin VII was used as the base resin of the foam, the amount of the nucleating agent was 0.3 wt. part and the amount of the foaming agent was 2.1 wt. part. Physical properties of the laminated foams obtained in the same manner as in Example 1 are presented in Table 1 and Table 2. The mixing weight ratio of resins VII and VIII constituting the innermost resin layer and outermost resin layer was 70:30.

Comparative Example 3

The laminated foam was obtained in the same manner as in Example 1, except that the amount of the foaming agent added was 3.0 wt. parts; all other conditions are presented in Table 2. Physical properties of the laminated foams obtained in the same manner as in Example 1 are presented in Table 1 and Table 2.

TABLE 1

| | | Innermost resin layer | | Laminated foam | | | | |
| --- | --- | --- | --- | --- | --- | --- | --- | --- |
| | | MFR: X (g/10 min) | Thickness: Y (μm) | Density of foam: d (g/L) | Thickness (mm) | Closed cell ratio (%) | Surface resistivity (Ω) | 0.29 dX |
| Examples | 1 | 5 | 194 | 225 | 3.1 | 87 | $1.5 \times 10^{12}$ | 326 |
| | 2 | 10 | 150 | 130 | 4.0 | 85 | $6.6 \times 10^{10}$ | 377 |
| | 3 | 17 | 150 | 130 | 4.0 | 87 | $5.8 \times 10^{11}$ | 641 |
| | 4 | 10 | 150 | 130 | 4.0 | 73 | $3.2 \times 10^{12}$ | 377 |
| | 5 | 10 | 150 | 130 | 4.0 | 83 | $4.3 \times 10^{12}$ | 377 |
| | 6 | 32 | 150 | 130 | 4.0 | 87 | $6.2 \times 10^{12}$ | 1206 |
| | 7 | 5 | 150 | 130 | 4.0 | 82 | $9.5 \times 10^{10}$ | 189 |
| | 8 | 10 | 150 | 130 | 4.0 | 85 | $6.7 \times 10^{10}$ | 377 |
| | 9 | 17 | 150 | 130 | 4.0 | 87 | $4.4 \times 10^{10}$ | 641 |
| | 10 | 10 | 150 | 130 | 4.0 | 84 | $1.5 \times 10^{12}$ | 377 |
| | 11 | 12 | 117 | 143 | 4.0 | 86 | $2.4 \times 10^{12}$ | 498 |
| | 12 | 12 | 154 | 143 | 5.0 | 82 | $3.0 \times 10^{12}$ | 498 |
| Comparative examples | 1 | 5 | 194 | 130 | 5.0 | 55 | $1.5 \times 10^{12}$ | 189 |
| | 2 | 2 | 150 | 130 | 4.0 | 42 | $1.2 \times 10^{11}$ | 75 |
| | 3 | 5 | 194 | 111 | 4.0 | 50 | $8.0 \times 10^{10}$ | 161 |

TABLE 2

| | | Innermost resin layer | | | Outermost resin layer | | | | Basis weight of each layer of laminated foam |
| --- | --- | --- | --- | --- | --- | --- | --- | --- | --- |
| | | Type | MFR (g/10 min) | Layer thickness (μm) | Type | Amount of antistatic agent added (wt. %) | MFR α/β (g/10 min) | Layer thickness (μm) | (outermost resin layer/innermost resin layer/foam/innermost resin layer/outermost resin layer) (g/m²) |
| Examples | 1 | Resin I | 5 | 194 | Polymer A/Resin I | 15 | 17/5 | 28 | 25/175/600/175/25 |
| | 2 | Resin II* | 10 | 150 | Polymer A/Resin II | " | 17/10 | " | 25/135/480/135/25 |
| | 3 | Resin III | 17 | 150 | Polymer A/Resin III | " | 17/17 | 28 | 25/135/480/135/25 |
| | 4 | Resin II* | 10 | 150 | Polymer B/Resin II* | 15 | 21/10 | " | " |
| | 5 | Resin II* | 10 | 150 | Polymer C/Resin II | 20 | 70/10 | " | " |
| | 6 | Resin IV | 32 | 150 | Polymer C/Resin IV | " | 70/32 | " | " |
| | 7 | Resin I* | 5 | 150 | Polymer E/Resin I | " | 100 or more/5 | " | 25/135/480/135/25 |
| | 8 | Resin II* | 10 | 150 | Polymer E/Resin II | " | 100 or more/10 | " | " |
| | 9 | Resin III* | 17 | 150 | Polymer E/Resin III | " | 100 or more/17 | " | " |
| | 10 | Resin II | 10 | 150 | Polymer D/Resin V | 20 | 20/2 | " | 25/135/480/135/25 |
| | 11 | Resin VII/Resin VIII | 12 | 117 | Polymer E/Resin VII/Resin VIII | 15 | 100 or more/12 | 27 | 25/108/533/108/25 |
| | 12 | Resin VII/Resin VIII | 12 | 154 | Polymer E/Resin VII/Resin VIII | 15 | 100 or more/12 | 27 | 25/142/667/142/25 |
| Comparative Examples | 1 | Resin I | 5 | 194 | Polymer A/Resin I | 15 | 17/5 | 28 | 25/175/600/175/25 |
| | 2 | Resin V | 2 | 150 | Polymer E/Resin V | 15 | 100 or more/2 | 28 | 25/135/480/135/25 |
| | 3 | Resin I | 5 | 194 | Polymer E/Resin I | 15 | 100 or more/5 | 28 | 25/175/400/175/25 |

*Thermoplastic elastomer (ethylene-octane random copolymer, MFR = 10.6 g/10 min), trade name AFFINITY EG8200 made by DOW CHEMICAL JAPAN, LTD., of 2.5 wt % was further added

What is claimed is:

1. A multiple layered laminated polyolefin foam having a plurality of polyolefin layers laminated on at least one side of a polyolefin foam by a co-extrusion foaming method and wherein the polyolefin foam has a boiling xylene insoluble content of 0 to 5 wt %, said polyolefin foam comprising:

an outermost layer formed from one of the plurality of polyolefin layers, an innermost layer formed from one of the plurality of polyolefin layers, wherein a thickness of the outermost layer is 5 to 80 μm; and a density d (g/L) of said polyolefin foam, a melt flow rate X (g/10 min) of a polyolefin resin constituting the innermost layer, and a thickness Y (μm) of the innermost layer satisfy the following relationships (1) to (4):

$$Y \leq 0.29dX \quad (1)$$

$$5 \leq X \leq 40 \quad (2)$$

$$70 \leq Y \leq 300 \quad (3)$$

$$100 \leq d \leq 300 \quad (4)$$

wherein a thickness of the entire laminated foam is 3 to 8 mm and a closed cell of the laminated foam is no less than 60%, wherein the outermost layer contains a polymeric-type antistatic agent so that a surface layer resistivity is no more than $1 \times 10^{13}$ Ω, wherein a ratio (α/β) of a melt flow rate (α) of the polymeric-type antistatic agent and a melt flow rate (β) of a base resin of the outermost layer is no less than 0.5 and β is 3 to 35 g/10 min.

2. The multiple layered laminated polyolefin foam according to claim 1, wherein the density d (g/L) of the polyolefin foam is 120 to 300 g/L, the melt flow rate X (g/10 min) of the polyolefin resin constituting the innermost layer is 8 to 40 g/10 mm, and the thickness Y (μm) of the innermost layer is no more than 0.26dx.

3. The multiple layered laminated polyolefin foam according to claim 1, wherein the base resin selected from the group consisting of polypropylenes, polyethylenes and mixtures thereof.

4. The multiple layered laminated polyolefin foam according to claim 1, wherein the polymeric-type antistatic agent comprises a compound selected from the group consisting of polyetheresteramides and polyethers as a main component.

5. The multiple layered laminated polyolefin foam according to claim 4, wherein the polyetheresteramide is a polymer obtained by polymerization reaction of a polyamide with an alkylene oxide adduct of a bisphenol.

6. The multiple layered laminated polyolefin foam according to claim 5, wherein the polyamide is selected from the group consisting of caprolactam polymer, 12-aminododecanoic acid polycondensate, and adipic acid-hexamethylene diamine polycondensate.

7. The multiple layered laminated polyolefin foam according to claim 4, wherein the polymeric-type antistatic agent is present in the outermost polyolefin layer in an amount of from 2 to 30 wt. %.

8. The multiple layered laminated polyolefin foam according to claim 4, wherein the polyether is a compound having at least two quaternary ammonium bases and is a reaction product of (a) an oxyalkylene ether obtained by addition reaction of an alkylene oxide with a phenol-divinyl benzene addition polymer, (b) one type of glycidyl ether selected from the group consisting of glycidyl ethers of polyoxyalkylene glycols and glycidyl ethers of adducts of phenols and alkylene oxides, an amine compound having an aliphatic hydrocarbon group containing 1 to 22 carbon atoms, and a quaternizing agent.

9. The multiple layered laminated polyolefin foam according to claim 8, wherein (a) the polyoxyalkylene ether is an adduct obtained by the addition reaction of ethylene oxide and a copolymer of ethylene oxide and propylene oxide with a bisphenol-divinyl benzene addition polymer; (b) the glycidyl ether of polyoxyalkylene glycol is glycidyl ether of polyoxyethylene glycol, and the adduct of a phenol and an alkylene oxide is an adduct of bisphenol and ethylene oxide.

10. The multiple layered laminated polyolefin foam according to claim 1, wherein the polymeric-type antistatic agent is present in the outermost polyolefin layer in an amount of from 2 to 30 wt. %.

11. The multiple layered laminated polyolefin foam according to claim 1, wherein the closed cell ratio of the laminated foam is at least no less than 70%.

12. The multiple layered laminated polyolefin foam according to claim 1, wherein the closed cell ratio of the laminated foam is at least no less than 80%.

* * * * *